United States Patent
Schmalenbach et al.

[11] Patent Number: 5,211,333
[45] Date of Patent: May 18, 1993

[54] HEATING SYSTEM FOR VEHICLES

[75] Inventors: Dietrich Schmalenbach, Gruibingen; Hans Hintennach, Baltmannsweiler, both of Fed. Rep. of Germany

[73] Assignee: J. Eberspacher, Esslingen, Fed. Rep. of Germany

[21] Appl. No.: 879,041

[22] Filed: May 6, 1992

[30] Foreign Application Priority Data

May 8, 1991 [DE] Fed. Rep. of Germany ....... 4115138

[51] Int. Cl.$^5$ ........................................... G05D 23/00
[52] U.S. Cl. .................. 237/2 A; 237/12.3 C
[58] Field of Search ............. 237/2 A, 12.3 A, 12.3 B, 237/12.3 C

[56] References Cited

U.S. PATENT DOCUMENTS

| | | | |
|---|---|---|---|
| 2,726,042 | 12/1955 | Baier et al. | 237/12.3 C |
| 3,243,118 | 3/1966 | Walker | 237/12.3 B X |
| 4,538,760 | 9/1985 | Kobayashi | 237/2 A |
| 4,591,691 | 5/1986 | Badali | 237/12.3 B X |
| 4,700,888 | 10/1987 | Samulak | 237/2 A |
| 4,892,248 | 1/1990 | Robin et al. | 237/12.3 C X |
| 5,014,910 | 5/1991 | Koch et al. | 237/2 A |
| 5,048,752 | 9/1991 | Hintennach et al. | 237/2 A |
| 5,123,594 | 6/1992 | Humberg | 237/2 A |

Primary Examiner—William E. Tapolcal
Attorney, Agent, or Firm—McGlew and Tuttle

[57] ABSTRACT

A heating system for vehicles, comprising:
  a heater (2) generating heat during operation by combustion of fuel;
  a liquid/air heat exchanger (8) for supplying heat to a vehicle interior space;
  a liquid circuit passing through the heater (2) and the heat exchanger (8);
  a blower (10) associated with the heat exchanger (8);
  an electric switching controller (14) for the blower power, which is connected to the motor (12) of the blower (10) and operates in infinitely variable manner and substantially without losses;
  a bypass (32) of the heat exchanger (8) which is part of the liquid circuit;
  an electrically adjustable valve (30) in the liquid circuit for determining the extent of the flow through the heat exchanger (8) and the bypass (32);
  a vehicle interior space temperature sensor (50); and
  an electric regulating means (8) connected to said temperature sensor (50) and driving the switching controller (14) and the valve (30).

10 Claims, 1 Drawing Sheet

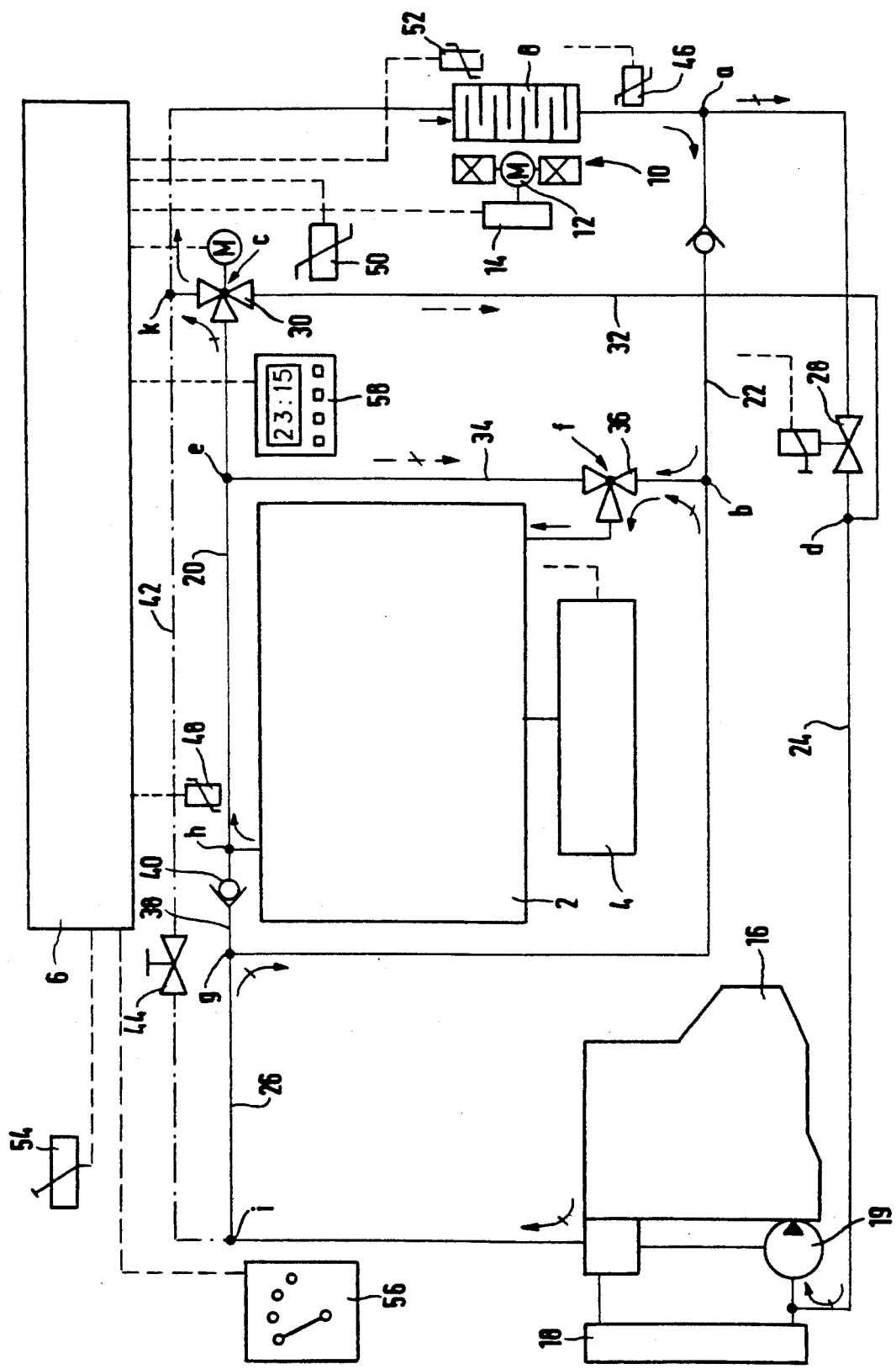

HEATING SYSTEM FOR VEHICLES

The invention relates to a heating system for vehicles, comprising:
- a heater generating heat during operation by combustion of fuel;
- a liquid/air heat exchanger for supplying heat to a vehicle interior space;
- a liquid circuit passing through the heater and the heat exchanger; and
- a blower associated with the heat exchanger.

Such vehicle heating system are known in a large variety of constructions and often are referred to as "auxiliary heatings" or "heatings independent of the vehicle engine", with these terms having in mind the particularly frequent field of use of heating motor vehicles driven by an internal combustion engine; this may involve heating of the vehicle interior space and/or prewarming of the combustion engine while the motor vehicle is at a standstill or, in other words, when the combustion engine is not in operation and thus does not deliver heat.

When considering a vehicle heating system having a given heat generating capacity, though this may be adapted to be controlled or regulated in its quantity, the quantity of the heat flow introduced into the vehicle interior space to be heated, in addition to being dependent on the temperature of the liquid upon entering the liquid/air heat exchanger and the temperature of the air acting on this heat exchanger, is dependent primarily on the blower power or output of the blower associated with the heat exchanger. Thus, the user of the known vehicle heating systems will set the blower to a high level when intensive heating of the vehicle interior space is desired or necessary. The user will set the blower low when less intensive heating is desired or sufficient.

Vehicle blowers known so far are provided with ohmic dropping resistor groups for being able to adjust the blower power. The dropping resistors convert electrical energy to waste heat when the blower is not set to maximum blower power. Irrespective of the setting of the blower power, there is thus always a consumption of approximately as much electrical energy as corresponds to the maximum current consumption of the blower motor.

It is the object of the invention to make available a vehicle heating system of the type indicated at the beginning, which allows automatic control of the temperature of the vehicle interior space with minimum current consumption.

To meet this object the vehicle heating system according to the invention is characterized by
- an electric switching controller for the blower power, which is connected to the motor of the blower and operates in infinitely variable manner and substantially without losses;
- a bypass of the heat exchanger that is part of the liquid circuit;
- an electrically adjustable valve in the liquid circuit for determining the extent of the flow through the heat exchanger and the bypass;
- a vehicle interior space temperature sensor; and
- an electric regulating means connected to said temperature sensor and driving the switching controller and the valve.

The regulating means according to the invention pays regard to the difference between the nominal temperature of the vehicle interior space and the actual temperature of the vehicle interior space as detected by the temperature sensor. Actuators are provided at least in the form of the switching controller and the electrically adjustable valve. Due to the fact that the switching controller operates substantially without losses, a substantial source of undesired current consumption, namely the ohmic dropping resistors usual so far, is eliminated. The reduction of the current consumption of vehicle heating systems is an important object since vehicle heating systems must draw on the limited supply of electrical energy in the vehicle batteries.

Preferred developments of the invention are indicated in the dependent claims.

Switching controllers operating substantially without losses, that can be employed in preferred manner with the heating system according to the invention, are DC/DC converters and switching controllers employing pulse width modulation. A 3/2-way distributing valve or a 3/2-way mixing valve are preferably used as electrically adjustable valve.

The heating system according to the invention preferably is incorporated in the coolant and heating circuit of a motor vehicle internal combustion engine serving to drive the vehicle. The heating system according to the invention is used in particularly preferred manner for heating driver's cabs of trucks. It is desirable to heat the driver's cabs of trucks, especially when the driver or drivers of the truck sleep in the driver's cab.

However, it is also pointed out that the heating system according to the invention can also be employed for other vehicles, in particular buses, passenger cars, building machines, caravans, recreational vehicles, and boats.

The invention and developments of the invention will be elucidated in more detail hereinafter by way of an embodiment shown in partly schematic manner.

The sole drawing figure shows a vehicle heating system inclusive of its incorporation in the coolant and heating circuit of an internal combustion engine serving to drive the vehicle, with the internal combustion engine, the heater proper and the regulating means being depicted in schematic manner.

Apart from liquid lines, various sensors, various actuators, electrical connections and operating members, the heating system shown substantially consists of a heater 2, a control device 4 associated with the heater 2, an electric or electronic regulating means 6, a liquid/air heat exchanger 8, and a blower 10 associated with the heat exchanger 8 and having a blower motor 12 and an electric switching controller 14. Shown is furthermore an internal combustion engine 16, which may be a spark ignition engine or a Diesel engine, together with its associated radiator 18 and its water pump, with the afore-mentioned heating system being incorporated in the coolant and heating circuit thereof.

The various illustrated liquid lines can be understood easiest in their function when the circuits and circuit parts described in the following are considered one after the other:

A first circuit, marked by arrows drawn in full lines, extends in a first circuit section 20 from the outlet of the heater 2 to the inlet of the heat exchanger 8 and, in a second circuit section, leads from the outlet of the heat exchanger 8 back to the inlet of the heater 2. At a point a, a third circuit section 24 branches off from the second circuit section 22 and leads to internal combustion engine 16. From internal combustion engine 16, a fourth circuit section 26 leads to point d located somewhat downstream of point a in the second circuit section 22. The third circuit section 24 has a magnetic valve 28 disposed therein that is selectively adjustable to the "open" or the "closed" state.

Liquid flowing through the first circuit containing the first circuit section 20 and the second circuit section 22 conveys heat only to heat exchanger 8. The blower 10, in the activated condition, conveys air, i.e. ambient air sucked in from the outside and/or air sucked in from the vehicle interior (circulating operation), across the heat exchanger 8 and blows the air heated therein into the vehicle interior space for heating the same. When the magnetic valve 28 is set to its position "open", part of the liquid flows through the third circuit section 24, the internal combustion engine 16 and the fourth circuit section 26, instead of flowing directly via the second circuit section 22 back to the heater 2. In this manner, heat is not only made available for heating the vehicle interior space, but also for heating the internal combustion engine 16, especially for ensuring startability of the internal combustion engine 16 at low ambient temperatures.

At a point c in the first circuit section 20, there is disposed a 3/2-way distributor valve 30 which is infinitely variable e.g. by means of a small electric motor. From point c a fifth circuit section 32 leads to point d in the third circuit section 24, which is located between the magnetic valve 28 and the internal combustion engine 16. The fifth circuit section is marked by an arrow in broken lines.

When the distributor valve 30 is in a first extreme position "all liquid coming from heater 2 to heat exchanger 8", there is no flow at all through the fifth circuit section 32. When the distributor valve 30 is in a second extreme position "all liquid coming from heater 2 through the fifth circuit section", there is no flow at all through the heat exchanger 8. In intermediate positions of the distributor valve 30, a flow takes place both through the heat exchanger 8 and through the fifth circuit section 32, with the ratio of the two flow quantities being dependent on the position of distributor valve 30. The fifth circuit section 32 thus constitutes a bypass for the heat exchanger 8 that is infinitely variable with respect to its flow quantity.

Instead of distributor valve 30 at point c, it is also possible to provide a 3/2-way mixing valve at point d in the third circuit section 24. The afore-described controllable bypass function of the fifth circuit section 32 remains the same by doing so.

From point e in the first circuit section 20, located between heater 2 and distributor valve 30, a sixth circuit section 34 leads to point f in the second circuit section 22, with point f being located between point b and heater 2. At said point f there is provided a 3/2-way thermostat valve 36. Thermostat valve 36 may be an electrically overridable thermostat valve e.g. of the type described in German Patent Application P 40 22 731.6. Upon starting heater 2 and, thus, while the liquid in the circuit sections described is relatively cold, the thermostat valve 36 is in a first extreme position "open path from the sixth circuit section 34 to heater 2", so that heated liquid leaving the outlet of heater 2 flows in a short circuit on a short path back to the inlet of heater 2; the liquid in the short circuit and the heater 2 itself are thus heated very rapidly. As the liquid temperature increases in the short circuit, the thermostat valve 36 is gradually controlled to its second extreme position "liquid path through second circuit section 22 open"; when this second extreme position is reached, there is no liquid at all flowing any more through the sixth circuit section 34.

Furthermore, there is a seventh circuit section 38 between point o of the fourth circuit section 26 and point h of the first circuit section 20. Point g is located between internal combustion engine 16 and point b. Point h is located between heater 2 and point e. The seventh circuit section 38 is provided with a nonreturn valve 40 permitting flow therethrough in the direction from point g to point h. The seventh circuit section 38 serves as a bypass of the heater 2 instead of the rear part of the fourth circuit section 26. Due to this bypass 38, the liquid flows from internal combustion engine 16 to heat exchanger 8 when heater 2 is turned off.

Finally, it is possible to provide an eighth circuit section 42 leading from point i in the fourth circuit section 26 to point k in the first circuit section 20. Point i is located between internal combustion engine 16 and point g. Point is located between point g and heat exchanger 8. Provided in the eighth circuit section 42 is a manually operable liquid valve 44. In case of disturbances in the heating system, the user can manually adjust by way of valve 44 whether or not heated liquid flows from the internal combustion engine 16 through the heat exchanger 8 and from there back to the internal combustion engine 16.

Near the outlet of heat exchanger 8 there is provided a first liquid temperature sensor 46. Near the outlet of heater 2 there is provided a second liquid temperature sensor 48. Numeral 50 designates a temperature sensor for the temperature of the air in the interior of the vehicle. 52 designates a temperature sensor for the air temperature at the air exit side of the heat exchanger 8. The temperature sensors 46, 48, 50, 52, the magnetic valve 28 and the distibutor valve 30 are electrically connected to regulating means 6. Shown are furthermore a nominal value generator 54 for the temperature in the interior of the vehicle, a multifunction switch 56 as well as a timer 58, with these components being also electrically connected to regulating means 6.

The control device 4 of heater 2, in coopearation with various sensors, fuses, switches as well as the components of the heater 2, controls in substantially usual manner the basic functions of heater 2, such as combustion air blower, liquid circulation pump of heater 2, fuel metering pump and the like. The multifunction switch 56 can be used for adjusting various functions, such as ON/OFF, maximum heating of the vehicle front window pane for defrosting, heating of the vehicle interior plus internal combustion engine, heating of internal combustion engine only, automatic.

The various afore-described electrical connections to the regulating means 6 are depicted in broken lines which, for increased clarity of the drawing, are partly not drawn fully until reaching the regulating means 6. The control device 4 also is electrically connected to regulating means 6. The liquid line points a to k described each constitute branch points.

The switching controller 14 for blower motor 12 preferably is either a DC/DC converter or a switching controller employing pulse width modulation. Such switching controllers are known per se, and switching controller 14 thus need not be described in more detail herein. The switching controller 14 and the regulating means 6, respectively, preferably are constructed such that the blower power of blower 10 can be adjusted substantially without losses and in infinitely variable manner between 15% and 70% of the maximum blower power.

The most important function of the regulating means 6 consists in regulating the heating of the vehicle interior in accordance with the temperate nominal value generator 54 and the interior space temperature sensor 50 in such a manner that the actual temperature of said interior space substantially corresponds to the set nominal temperature. For performing this regulating task, the regulating means 6 drives both the switching controller 14 and the distributor valve 30. Regulating means 6 is designed such that, when the actual temperature is higher than the nominal temperature, the blower power is primarily reduced by means of the switching controller 14 and secondarily, if still required, the distributor valve 30 is adjusted towards reduction of the flow through the heat exchanger 8. In the embodiment described, "secondary" means that the adjustment of the distributor valve 30 takes place only after the power has been reduced to 15%. When the actual temperature is below the nominal temperature, the distributor valve 30 in the embodiment described is primarily adjusted towards increasing the flow through the heat exchanger. The blower power is in secondary manner adjusted towards an increase. In the embodiment described, "secondary" means that the blower power is increased only after the distributor valve 30 has reached its extreme position. However, "secondary" can also mean that the blower power is increased with a delay in time. Furthermore, it is possible in alternative manner to already slowly increase the blower power simultaneously with the adjustment of the distributor valve 30 towards an increase of the flow through the heat exchanger 8.

Using the temperature sensor 48, another function of the regulating means 6 consists in incorporating the liquid temperature at the outlet of the heater 2 in the regulating operation and in thus modifying the regulating operation described thus far. When the liquid temperature at temperature sensor 48 is relatively high, the "reward" is a relatively high blower power and vice versa. Furthermore, this "exploitation" of a relatively high liquid temperature by an increased blower power is particularly rewarding when the actual temperature of the vehicle interior space is relatively far below the nominal temperature. These additional considerations, which are preferred as developments of the invention, are included and claimed in claims 4 and 5.

The heat generating power of heater 2 is controlled by means of temperature sensor 46. The liquid temperature at the outlet of heat exchanger 8 is a measure for the amount of thermal output to be supplied to the liquid in the heater 2 for reaching at the outlet of heater 2 an optimum temperature of preferably approx. 80° C. of the liquid. A possible way of achieving this consists in that the heater 2 is switched back to e.g. one quarter of its power during certain periods of time and is switched to maximum power during the remaining periods of time. This can be done by reducing the pump capacity of the metering pump supplying fuel, i.e. gasoline or Diesel fuel, to the heater 2, and by correspondingly reducing the speed of the combustion air blower of heater 2. The temperature sensor 46 alternatively may be provided between point b and point f. The temperature sensor 46 may be connected either to the regulating means 6 or to the control device 4.

We claim:

1. A heating system for vehicles, comprising:
    a heater (2) generating heat during operation by combustion of fuel;
    a liquid/air heat exchanger (8) for supplying heat to a vehicle interior space;
    a liquid circuit passing through the heater (2) and the heat exchanger (8); and
    a blower (10) associated with the heat exchanger (8), characterized by:
    an electric switching controller (14) for the blower power, which is connected to the motor (12) of the blower (10) and operates in infinitely variable manner and substantially without losses;
    a bypass (32) of the heat exchanger (8) which is part of the liquid circuit;
    an electrically adjustable valve (30) in the liquid circuit for determining the extent of the flow through the heat exchanger (8) and the bypass (32);
    a vehicle interior space temperature sensor (50); and
    an electric regulating means (8) connected to said temperature sensor (50) and driving the switching controller (14) and the valve (30).

2. A heating system according to claim 1, characterized in that the regulating means (6) is designed such that
    when the temperature in the vehicle interior space is below the nominal temperature—it drives the valve (30) in the direction towards increasing the flow through the heat exchanger (2); and—simultaneously or with a delay in time, if still necessary—it drives the switching controller (14) in the direction towards increasing the blower power; and such that
    when the temperature in the vehicle interior space is above the nominal temperature—it primarily drives the switching controller (14) in the direction towards reducing the blower power and, secondarily, if still necessary, drives the valve (30) in the direction towards reducing the flow through the heat exchanger (8).

3. A heating system according to claim 1, characterized in that a liquid temperature sensor (46) is provided at a location of the liquid circuit between the outlet of the heat exchanger (8) and the inlet of the heater (2); and in that the regulating means (6) or a control device (4) of the heater (2) is designed such that the heat generating capacity of the heater is regulated as a function of the difference between an optimum temperature of the liquid and the temperature detected by said liquid temperature sensor.

4. A heating system according to claim 1, characterized in that a liquid temperature sensor (48) is provided at a location of the liquid circuit between the outlet of the heater (2) and the heat exchanger (8); and in that the regulating means (6) is designed such that—when otherwise the same conditions are presupposed—a higher blower power is set via the switching controller (14) in case of a higher temperature detected by said liquid temperature sensor (48), and a lower blower power is set via the switching controller (14) in case of a lower temperature detected by said liquid temperature sensor (48).

5. A heating system according to claim 4, characterized in that the regulating means (6) is designed such that the temperature detected by said liquid temperature sensor (48) is considered in increasing manner as the difference between nominal temperature of the vehicle interior space and actual temperature of the vehicle interior space increases.

6. A heating system according to claim 1, characterized in that the switching controller (14) is a DC/DC converter.

7. A heating system according to claim 1, characterized in that the switching controller (14) is a switching controller employing pulse width modulation.

8. A heating system according to claim 1, characterized in that the electrically adjustable valve (30) is a 3/2-way distributor valve or a 3/2-way mixing valve.

9. A heating system according to claim 1, characterized in that it is incorporated in the coolant and heating circuit of an internal combustion engine (16) of a motor vehicle.

10. A heating system according to claim 1, characterized in that it is provided in the form of a heating system for heating the driver's cab of a truck.

* * * * *